United States Patent [19]

Nuns

[11] Patent Number: 4,868,728

[45] Date of Patent: Sep. 19, 1989

[54] REGULATOR SYSTEM FOR A SWITCHING MODE INVERTER GENERATOR

[75] Inventor: Jacques Nuns, Ecuelles, France

[73] Assignee: Service National Electricite de France, Paris, France

[21] Appl. No.: 128,692

[22] Filed: Dec. 4, 1987

[30] Foreign Application Priority Data

Dec. 5, 1986 [FR] France .................................. 86 17099

[51] Int. Cl.$^4$ ............................................ H02M 3/335
[52] U.S. Cl. ......................................... 363/17; 363/98; 363/132
[58] Field of Search ....................... 363/16, 17, 56, 58, 363/96, 97, 98, 132, 136, 37

[56] References Cited

U.S. PATENT DOCUMENTS

| | | | |
|---|---|---|---|
| 3,596,165 | 7/1971 | Andrews | 363/16 X |
| 3,806,688 | 4/1974 | Mackenzie et al. | 219/10.77 X |
| 4,541,041 | 9/1985 | Park et al. | 363/41 |
| 4,626,978 | 12/1986 | Thouvenin | 363/49 X |

OTHER PUBLICATIONS

J. M. Thouvenin, "Thyristor Inverter for Induction Heating", Electronique Industrielle, 3/82, pp. 23-24.
King et al., "Inherent Overload Protection for the Series Resonant Converter", IEEE Transactions on Aerospace and Electronic Systems, 11/83, pp. 820-828.
Cheron et al., "Study of a New Use for Power Transistors in High Voltage Converters with High Frequency", ReVue de Physique Appliquee, 6/81, pp. 333-342.

Primary Examiner—Patrick R. Salce
Assistant Examiner—Kristine Peckman
Attorney, Agent, or Firm—Blakely, Sokoloff, Taylor & Zafman

[57] ABSTRACT

A regulator system for a switching mode inverter generator feeding an inductively coupled load and seeing the load as a series resonant circuit having a resonant frequency which varies with its magnetic state comprises two switches which connect the load to the output of the inverter. Each switch comprises a switching element and switching terminals. A diode shunts the switching terminals of each switching element of each switch. A control loop slaves the output frequency of the inverter to the resonant frequency of the load. A second control loop is responsive to the inverter power output or the inverter supply voltage. The system is suitable for inductive heating furnaces as used in industry.

13 Claims, 11 Drawing Sheets

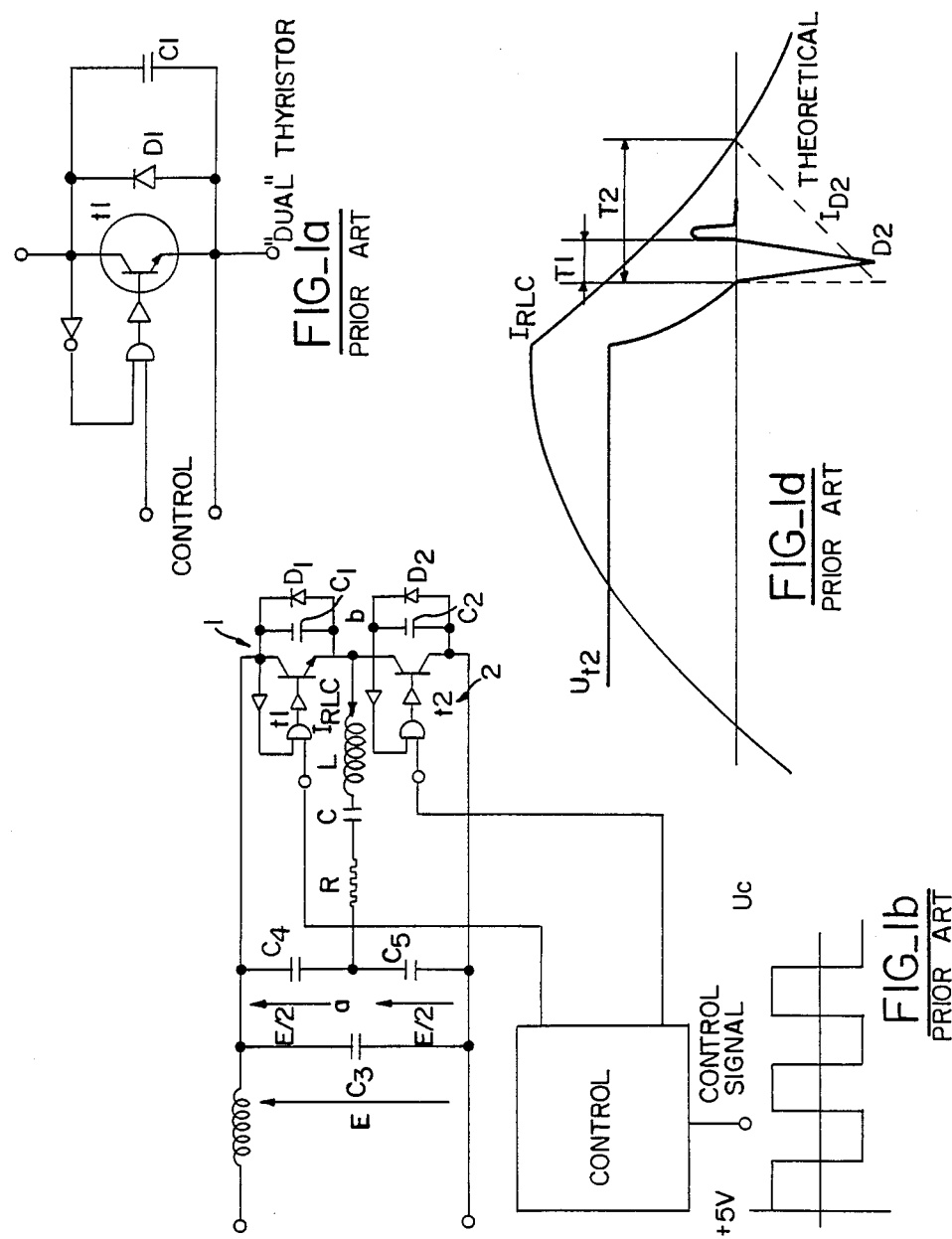

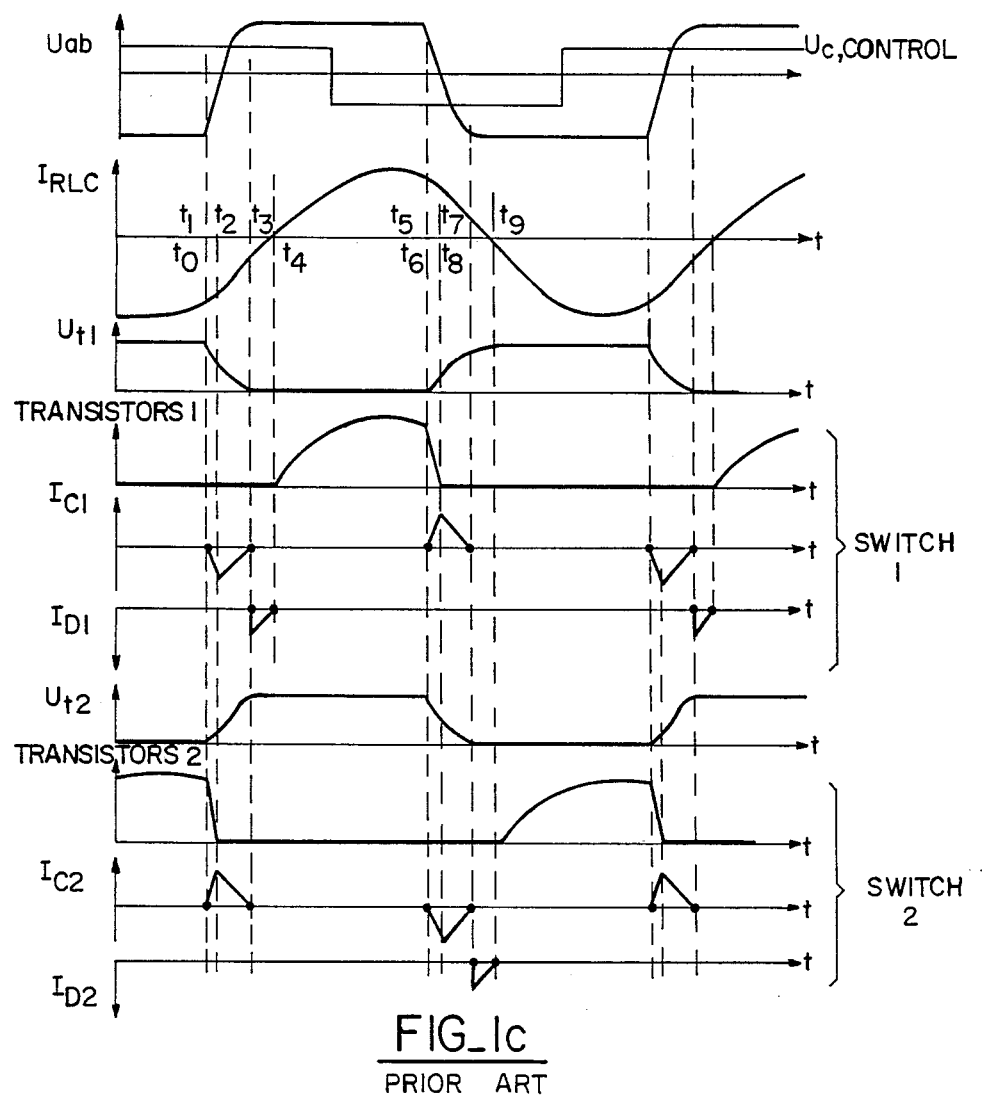
FIG_1c
PRIOR ART

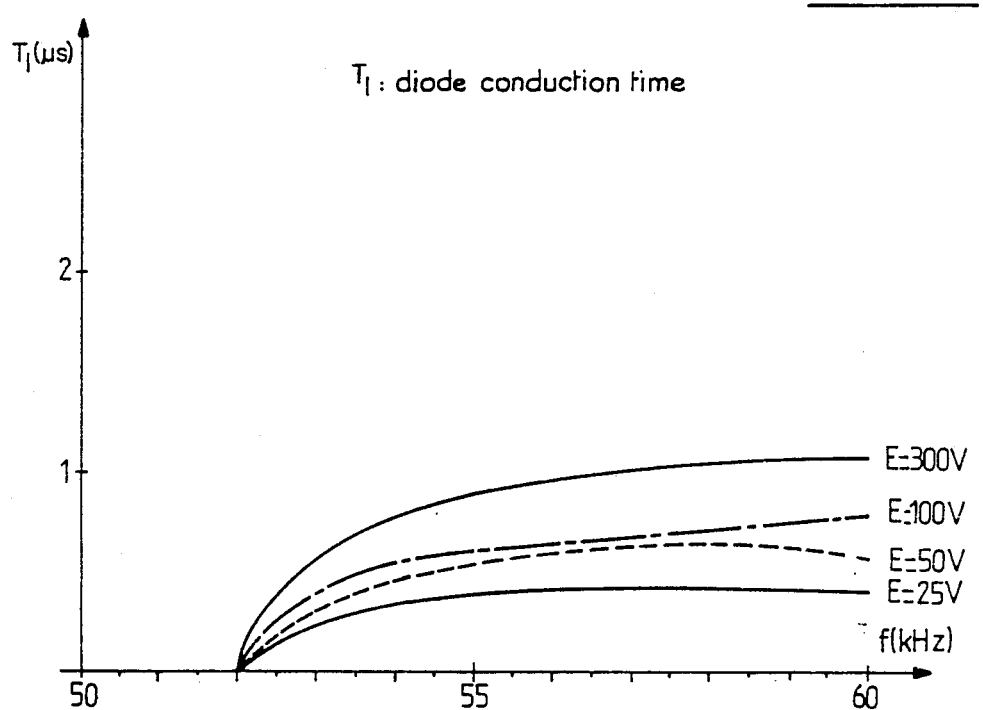
FIG_2a
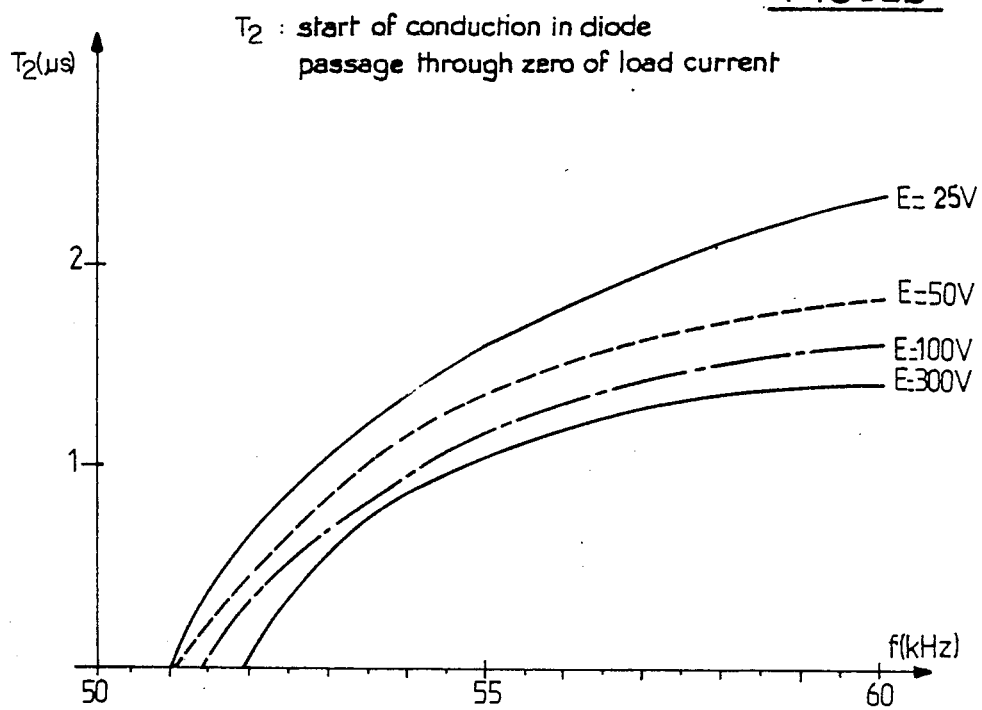
FIG_2b

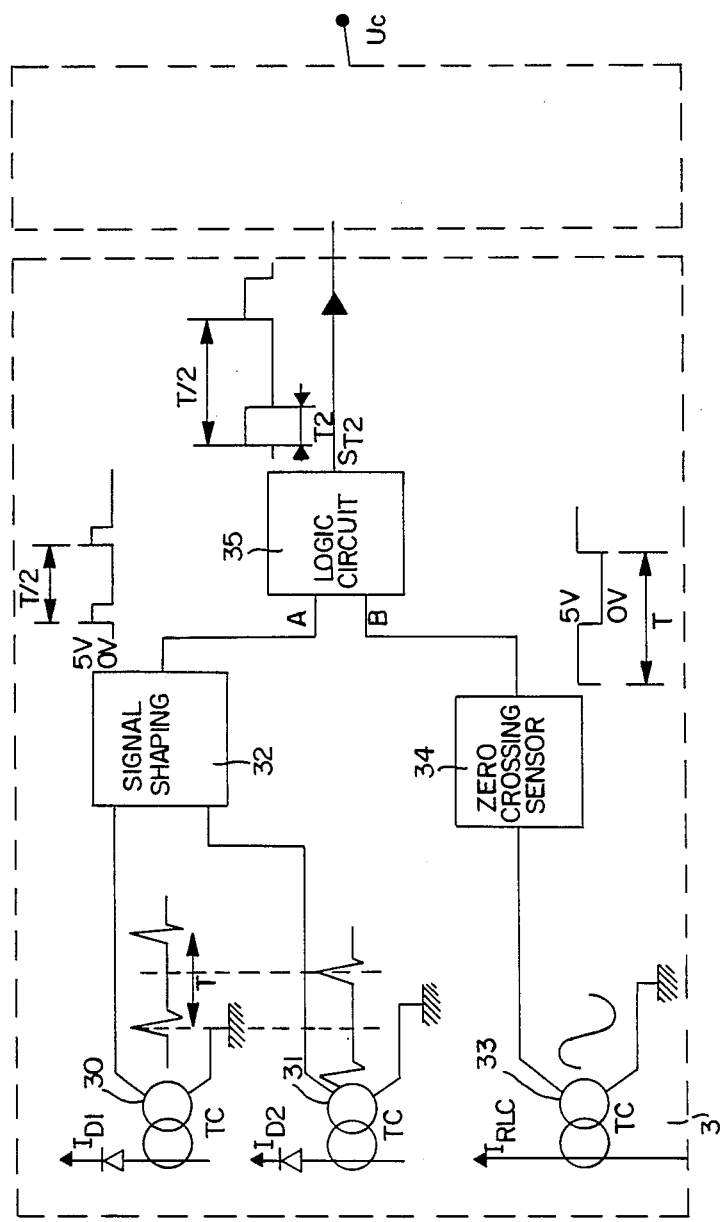
FIG_3a

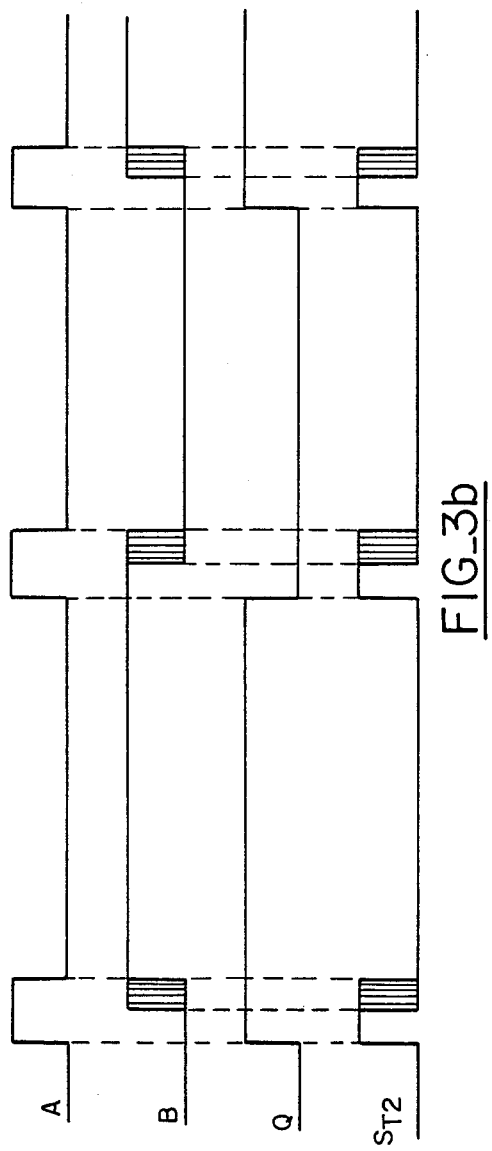

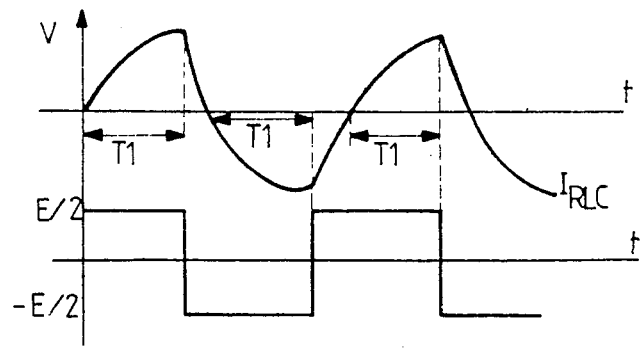
FIG_4a
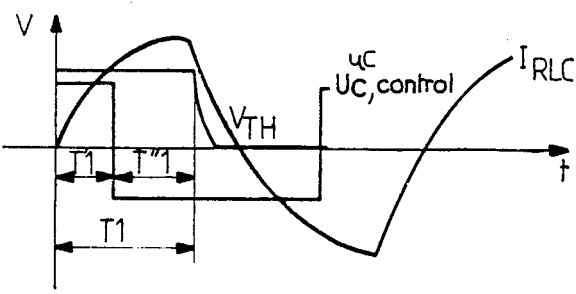
FIG_4b
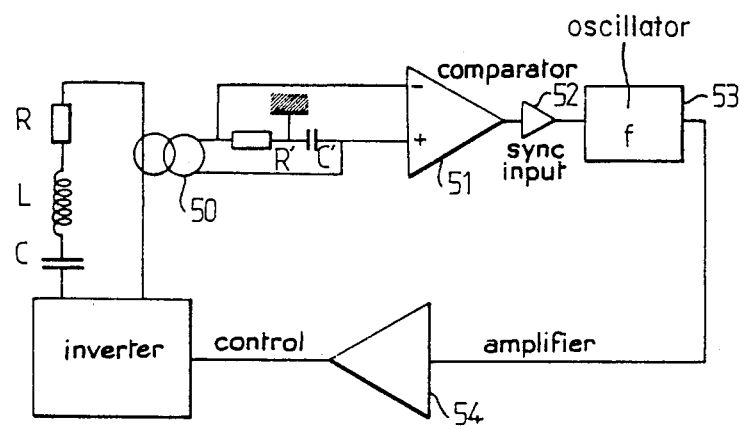
FIG_4c

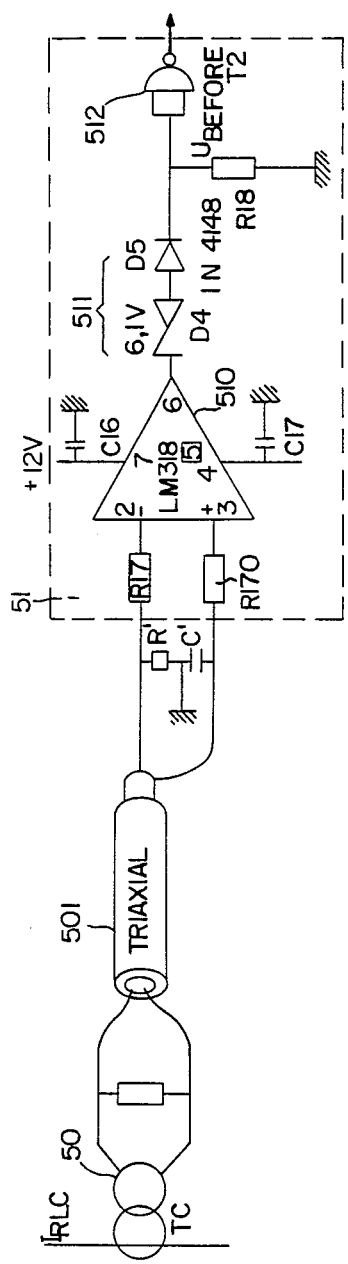
FIG_4d

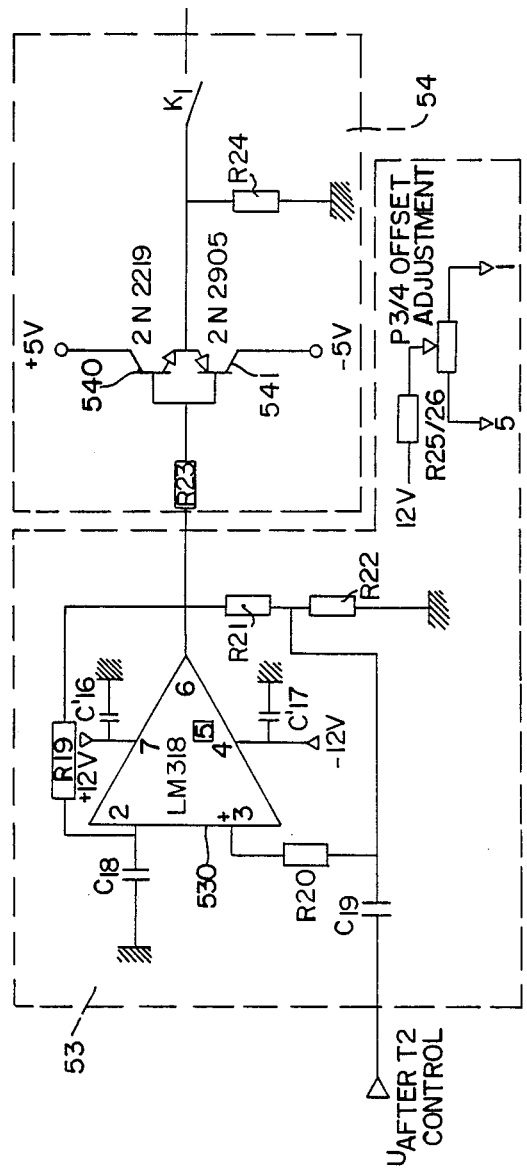
FIG_4e

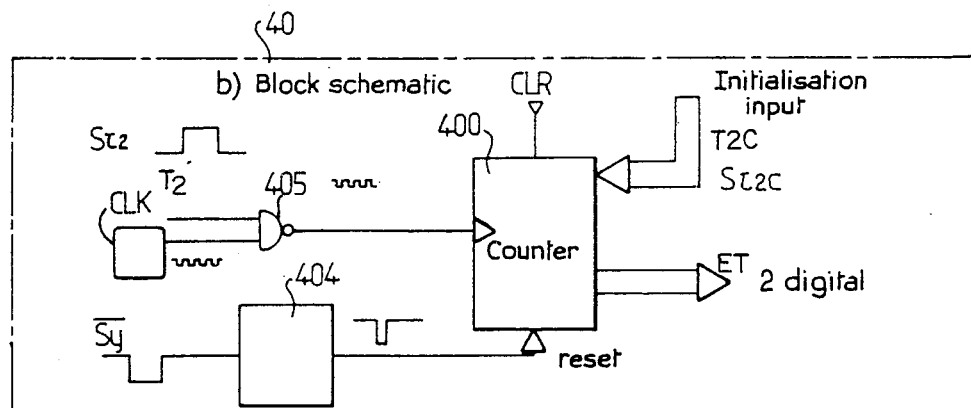
FIG_5a
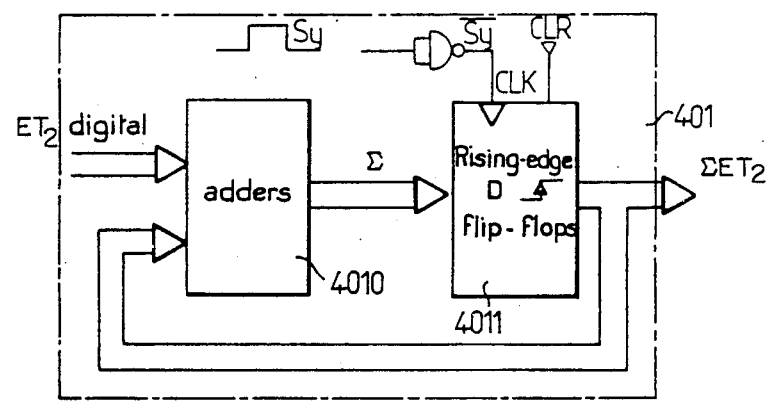
FIG_5b
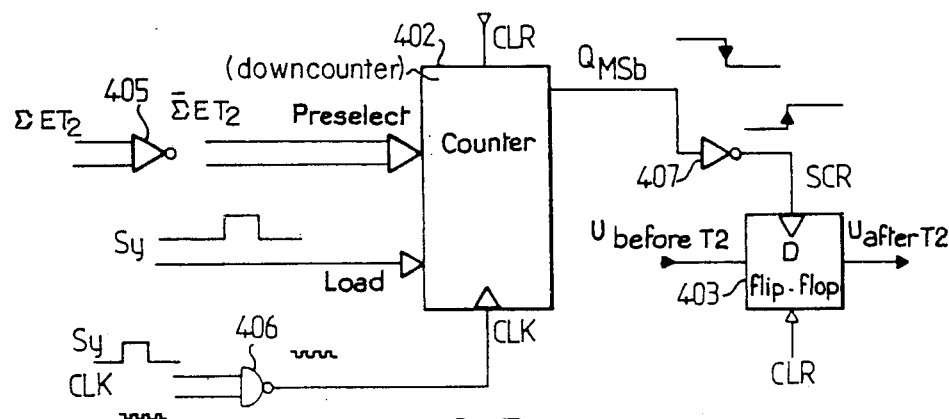
FIG_5c

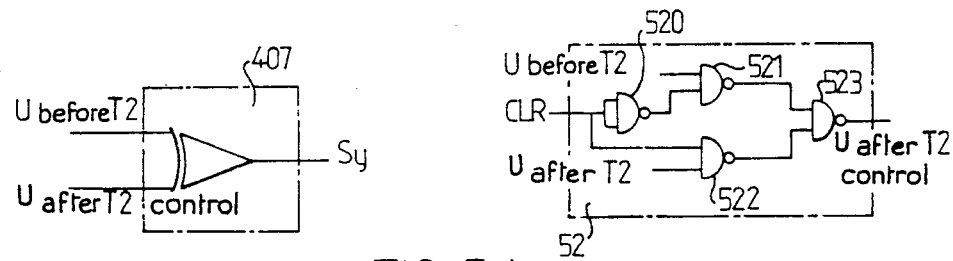
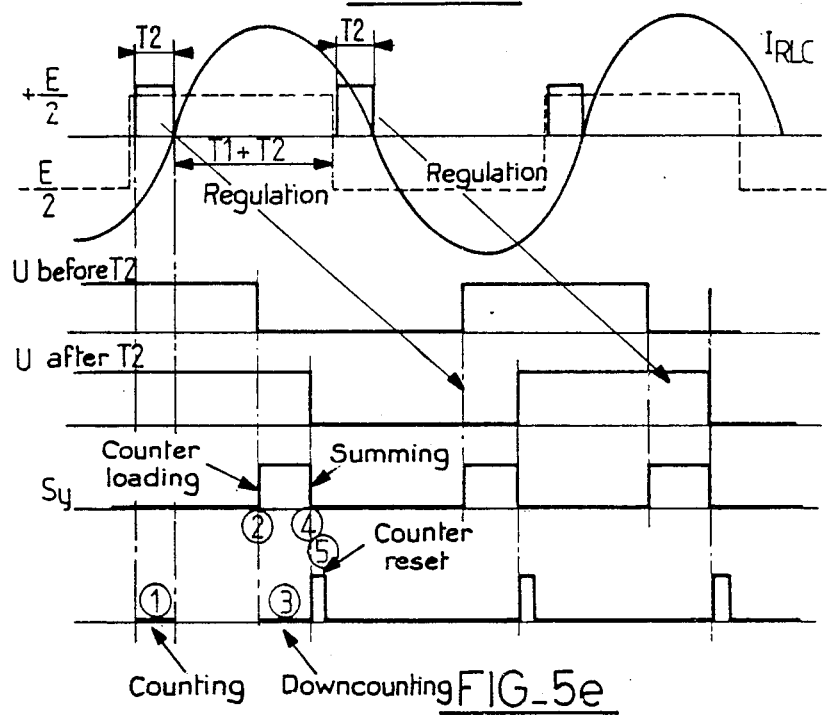
FIG_5d
FIG_5e
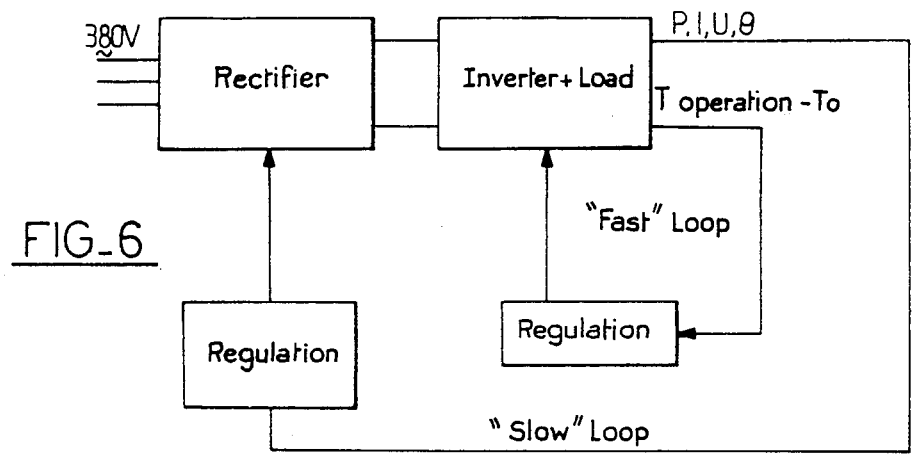
FIG_6

REGULATOR SYSTEM FOR A SWITCHING MODE INVERTER GENERATOR

BACKGROUND OF THE INVENTION

1. Field of the invention

The invention concerns a regulator system for a transistorized inverter generator feeding an inductively coupled load.

2. Description of the prior art

Induction heatint entails creating an alternating magnetic field in a conductive material, this magnetic field inducing Eddy currents in the material which dissipate energy within the latter by virtue of the Joule effect.

In principle, the energy dissipated within the material and the power transmitted per unit volume can by very high. The energy is dissipated at the surface of the part subjected to the induction phenomenon, the thickness to which energy penetrates into the material from which it ismade depending on the magnetic characteristics of the material and on the frequency of the alternating magnetic field.

In all applications the load as "seen" by the induction generator used may be represented by a series or parallel RLC circuit, the inductor having an inductive and resistive impedance, impedance matching being achieved by means of transformers, the capacitors thus operating at an acceptable voltage.

In the applications previously mentioned, the impedance or load as seen by the generator is constantly varying, in particular on passing through the Curie point for the magnetic material and transfer into or movement within the inductor or induction furnance of the parts to be treated.

The generators employed consist of AC-DC-AC converters and feed the series resonant RLC circuit. The generators correspond, for example, to a bridge or half-bridge circuit in which the RLC load is connected in series with the output of an inverter, constituting a controlled generator, through the intermediary of at least two zero-voltage switches. The switches comprise switching elements, the switchng terminals of the latter being connected in parallel with a diode and a capacitor. Generators of this kind available through ordinary commercial channels and the corresponding waveforms are shown in FIGS. 1a through 1d in the non-limiting case where the switches consist of "dual" thyristors, this type of component being well known in the current state of the art and shown in FIG. 1a in particular.

FIG. 1b shows a half-bridge inverter in which "dual" thyristors are used as the switches 1 and 2.

With this type of generator, the fact of working with a voltage source and of having a series load requires in practice that at the operating frequency the frequency of the control signal $U_C$ is at all times higher than the resonant frequency of the load consisting of the series resonant RLC circuit.

The power transmitted to the load by the generator depends on the amplitude of the supply voltage delivered by the generator, the voltage U applied to the inductor and the current $I_{RLC}$ flowing through the load, together with the phase difference between the last two of these parameters. For a given amplitude of the supply voltage the power transmitted is maximal when the operating frequency is equal to the resonant frequency of the load. This is a limiting case which cannot be achieved because of the highly variable operating conditions as previously mentioned.

An object of the invention is to overcome the aforementioned disadvantage by using a regulator system for a switching mode inverter generator feeding an inductively coupled load in which maximal transmission of power to the load is achieved at all times by continously slaving the frequency of the supply voltage to a frequency near the resonant frequency of the load.

Another object of the switching mode inverter regulator system in accordance with the invention is to regulate the power transmitted inductively to the load.

SUMMARY OF THE INVENTION

The present invention consists of a regulator system for a switching mode inverter generator adapted to feed an inductively coupled load and seeing said load as a series resonant circuit having a resonant frequency which varies with its magnetic state, said system comprising at least two switches adapted to connect said load to the output of said inverter, each of said at least two switches comprising a switching element and switching terminals, a respective diode shunting said switching terminals of said switching element of each of said at least two switches, and a control loop adapted to slave the output frequency of said inverter to said resonant frequency of said load.

The regulator system in accordance with the invention for a switching mode inverter generator finds an application in any type of induction furnace, as used routinely for melting metals, reheating prior to forming, heat treatment, surface treatment, welding and brazing.

The invention will be better understood from a reading of the following description given by way of example only and with reference to the appended schematic drawings.

BRIEF DESCRIPTION OF THE DRAWINGS

FIGS. 1a through 1d respectively show a circuit diagram of a dual thyristor, a circuit diagram of a half-bridge inverter including switches consisting of dual thyristers, the waveforms of currents and voltages at the corresponding test points in FIG. 1b, and the waveform of the load current $I_{RLC}$, the voltage across transistor t2 and the corresponding diode current $I_{D2}$.

FIG. 2a and 2b respectively show the variation in the conduction time of the diode connected in parallel with the switching terminals of the switching element constituting a switch and the time-delay $\tau_2$ at which conduction starts in this diode relative to the time at which the load current $I_{RLC}$ passes through zero, dependent on the frequency of the supply voltage and for various values of the amplitude E thereof.

FIGS. 3a, 3b and 3c respectively show a block diagram of a circuit for measuring the time-delay $\tau_2$ at which conduction starts in the diodes $D_1$, $D_2$ relative to the time at which the load current $I_{RLC}$ passes through zero and for correcting the frequency of the supply voltage, significant waveforms of signals generated by the circuit shown in FIG. 3a and a particularly advantageous but non-limiting implementation of the block diagram of FIG. 3a using hybrid technology.

FIGS. 4a, 4b and 4c respectively show the waveform of the load current $I_{RLC}$ compared with the supply voltage delivered by the generator, the waveform of this load current $I_{RLC}$ compared with the control voltage $U_C$, control applied to the input of the inverter and a block diagram of a self-oscillation initiator loop for starting up the generator.

FIGS. 4d and 4e show one particularly advantageous embodiment of the start-up self-oscillation control loop.

FIGS. 5a, 5b, 5c and 5d show one particularly advantageous embodiment using high-speed digital technology of the circuit for correcting the frequency of the supply voltage delivered by the inverter to the load, and FIG. 5e is a timing diagram of control signals for various components in FIGS. 5a, 5b, 5c and 5d relative to the load current $I_{RLC}$.

FIG. 6 is a general block diagram of a regulator system in accordance with the invention provided with a power level regulator loop.

DESCRIPTION OF THE PREFERRED EMBODIMENTS

Figure 3C:
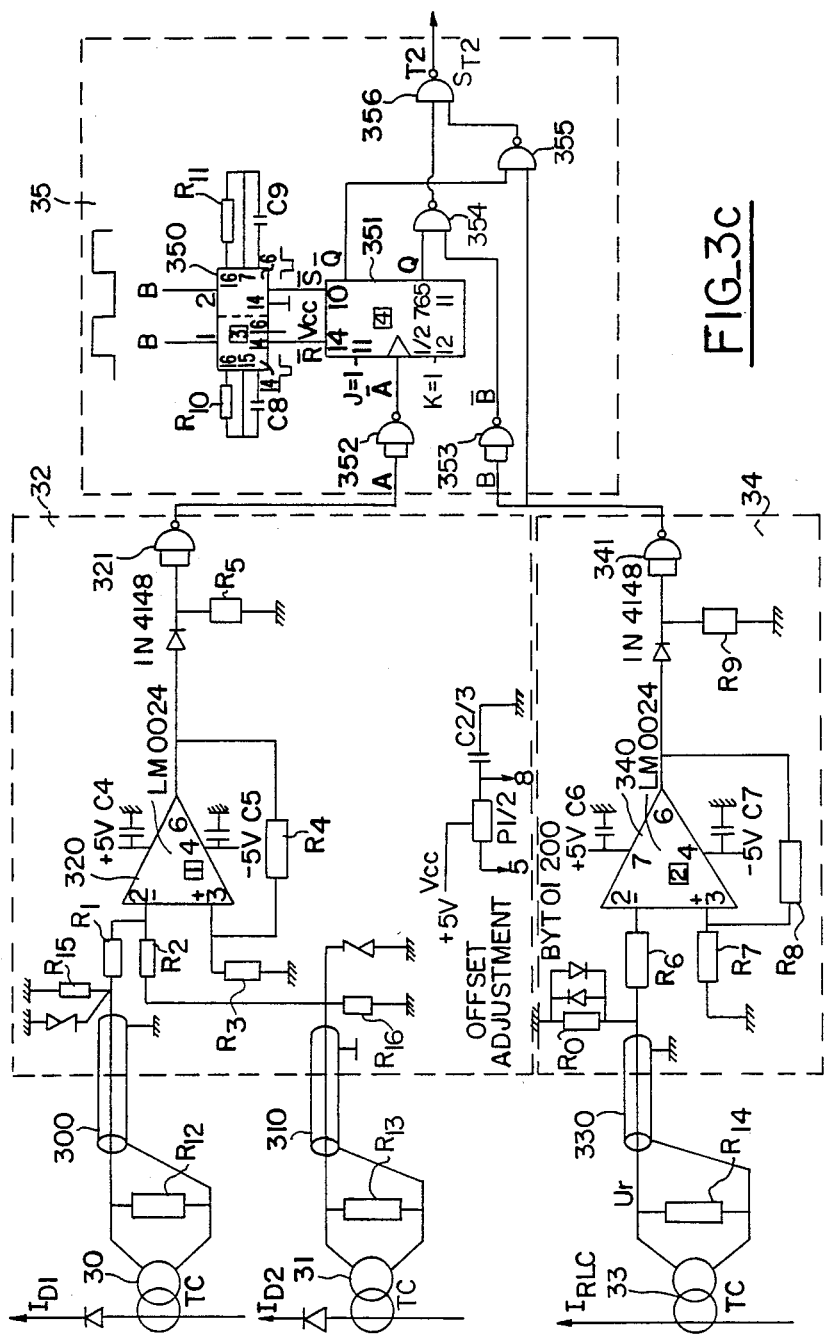

The regulator system in accordance with the present invention for a switching mode inverter generator feeding an inductively coupled load will initially be described with reference to FIGS. 1a through 1d.

As seen in FIG. 1b in particular, the load consisting of the inductor and the material to be treated has the same impedance as a series resonant circuit denoted R, L, C in this figure. This load is connected in series with the output of the inverter, between points a and b of the latter. The load constituting the series resonant circuit RLC is connected to the output of the inverter through the intermediary of at least two switches denoted 1 and 2 in FIG. 1b. These switches each comprise a respective switching element denoted t1 and t2 in FIG. 1b. The switching terminals of each switching element t1 and t2 are connected in parallel with a respective diode $D_1$, $D_2$ and a capacitor $C_1$, $C_2$.

In the conventional way, the switches 1 and 2 may consists of zero voltage switches, for example thyristors provided with a turn-off circuit.

In a more advantageous way the switching elements t1 and t2 may consist of transistors and as mentioned in the preamble to this description, the transistors t1, t2 together with their diodes $D_1$ and $D_2$ and their capacitors $C_1$ and $C_2$ as shown in FIGS. 1a and 1b are configured in such a way as to constitute dual thyristors.

Dual thyristors are well-known in the current state of the art, and it will suffice to remind the reader that the equivalent switch can only be made to conduct when the voltage across it is at or very near zero volts, the switch that the dual thyristor constitutes being self-disabling if the current in the switch exceeds a predetermined limiting value. In the embodiment shown in FIG. 1b, the switch 1 or 2 opens immediately (neglecting the storage time) when an instruction to do so is fed to it and it is therefore the opening of these switches that determines the operating frequency of the inverter.

FIG. 1c shows various waveforms present at the test poins a and b in FIG. 1b together with the currents flowing through the main components of the device, for example the current flowing through the transistors t1 and t2, the voltage across the transistors t1 and t2 (switching terminals), the current flowing through the diodes $D_1$ and $D_2$ and the current flowing through the capacitors $C_1$ and $C_2$ connected in parallel with the diodes $D_1$ and $D_2$. The waveforms shown in FIG. 1c correspond to an inverter control signal $U_C$ as shown in FIG. 1b.

According to one essential feature of the regulator system in accordance with the invention, the system comprises a control loop for the frequency of the supply voltage, denoted E, delivered by the inverter across the capacitor C3, this voltage representing, in the half-brige circuit shown in FIG. 1b, a supply voltage of amplitude E/2 across each of the capacitors C4 and C5 of the half-bridge. In a particularly advantageous way the frequency of the supply voltage delivered by the inverter is slaved to a frequency close to the resonant frequency of the load, which frequency varies with the magnetic state of the load. The generator could equally well comprise four switches and be configured as a full-bridge circuit. These switches would then be controlled in pairs and the diode conduction times would correspond always to two diodes.

According to one particularly advantageous feature of the regulator system in accordance with the invention for a switching mode inverter generator, the frequency control loop comprises a loop for regulating the conduction time, denote $\tau_1$, of a diode $D_1$, $D_2$ connected in parallel with a switching element t1, t2 and/or the time interval $\tau_2$ separating the time at which conduction begins in said diode and the time at which the load current $I_{RLC}$ circulating in the load during operation passes through zero.

FIG. 1d shows the load current $I_{RLC}$ flowing in the load during operation, the voltage across the transistor t2, i.e. at the switching terminals thereof, and the current flowing in the corresponding diode $D_2$.

As can be seen in FIG. 1d, if, in the absence of any regulation, the operating frequency, that is to say the frequency of the supply voltage delivered by the inverter, tends to fall below the resonant frequency of the load, then the time-delay or time interval $\tau_2$ separating the time at which the load current $I_{RLC}$ passes through zero and the time at which the diode beings to conduct tends to be cancelled out and the inverter is disabled.

The operating frequency can thus be regulated in such a way that it is advantageously maintained at all times higher than the resonant frequency of the load, that is the resonant frequency of the RLC circuit, so that the operating frequency is held slightly above the latter frequency so as to maintain the transmission of power to the load at a maximum level.

FIGS. 2a and 2b respectively show the conduction time $/_1$ of the diode $D_1$ or $D_2$ in question and then the time-delay of the load current $I_{RLC}$ passing through zero relative to the beginning of conduction in the diode, this time-delay being denoted $\tau_2$, as a function of the frequency of the supply voltage delivered by the inverter for various values of the amplified E of the latter.

According to one advantageous characteristic of the regulator system in accordance with the invention, the frequency control loop may advantageously be regulated as a function of the time or time interval $\tau_2$ between the time at which the diode starts conducting and the time at which the load current $I_{RLC}$ passes through zero, the average slope of the curve shown in FIG. 2b being in fact much steeper than that of the curve representing the conduction time of the corresponding diode, especially at low power levels. However, regulation on the basis of the conduction time parameter $\tau_1$ is not excluded.

A particularly advantageously embodiment of a regulator system in accordance with the present invention, and in particular of the frequency control loop thereof, will now be described with particular reference to FIGS. 3a through 3c.

The embodiment of the frequency control loop shown in FIG. 3a comprises, in an advantageous way, sensor means 3 for measuring the time interval $\tau hd 2$ separating the time at which the diode begins to conduct and the time at which the load current $I_{RLC}$ passes through zero. Means 4 are also provided for correcting the frequency of the voltage E delivered by the inverter according to the value of the time interval $\tau_2$ relative to a reference value, for correcting the frequency of the inverter control signal $U_C$.

The means 4 for correcting the frequency of the voltage delivered by the inverter could, to give a non-limiting example, consist of fully controlled correction means responsive to the value of the time interval $\tau_2$ relative to a reference value, as will be explained later in this description.

As is also shown in FIG. 3a, the sensor means 3 advantageously comprise first means 30 for sensing the current passing through the diode $D_1$ and second means 31 for sensing the current passing through the diode $D_2$. Means 32 for shaping the signals delivered by the first and second sensor means 30 and 31 serve to generate a periodic signal A the frequency of which is twice that of the currents flowing through the diodes $D_1$ and $D_2$. Third sensor means 33 serve to sense the current $I_{RLC}$ flowing through the load and to deliver a signal representative of this current. Note that the first, second and third sensor means 30, 31 and 33 may advantageously comprise current transformers denoted TC in FIG. 3a. Means 34 for sensing the passage through zero of the sensing signal delivered by the third means 33 sensing the current $I_{RLC}$ deliver a pulse denoted B on the aforementioned passage through zero. A logic circuit 35 receives the periodic signal at twice the frequency of the currents flowing through the diodes $D_1$ and $D_2$ and the pulses B delivered by the passage through zero sensing means. Thus the logic circuit 35 delivers a squarewave periodic signal denoted $S_{\tau 2}$ the cyclic ratio of which is representative of the time interval or time-delay $\tau_2$ of the current I'hd RLC in the load relative to the time at which diodes D1 and D2 begins to conduct.

In an advantageous but non-limiting way, the signal $S_{\tau 2}$ can be such that over a half-period denoted T/2 the pulse delivered is a direct measurement of the aforementioned time-delay $\tau_2$.

FIG. 3b shows the significant waveforms of signals generated by the circuit shown in FIG. 3a in a particularly advantageous but non-limiting embodiment thereof shown in FIG. 3c.

Referring to the aforementioned FIG. 3c, the means 32 for shaping the signals delivered by the first and second sensor means 30 and 31 advantageously comprise an operational amplifier 320 the negative input of which receives the signals delivered by the first and second sensor means 30, 31 and the positive input of which is connected to the output of the same amplifier in a feedback loop. A monostable 321 serves to shape the summed signals delivered by the summing amplifier 320.

In the same FIG. 3c embodiment, the logic circuit 35 advantageously comprises an RS type first flip-flop denoted 350 receiving on two inputs pulses B delivered by the means 34 for sensing passage through zero of the sensing signal and a JK type second flip-flop denoted 351 receiving the signal A delivered by the logic circuit or monostable 321 and delivering the squarewave periodic signal whose cyclic ratio is representative of the time interval $\tau_2$. The signal A is received by the JK type second flip-flop 351 through the intermediary of an inverter circuit 352 so as to deliver to the type JK flip-flop a complemented signal $\overline{A}$. The second flip-flop 351 also receive complemented output signals $\overline{R}$, $\overline{S}$ delivered by the RS type first flip-flop 350. The JK type second flip-flop 351 delivers two complementary signals Q and $\overline{Q}$ which serve to generate the squarewave periodic signal whose cyclic ratio is representative of the time interval $\tau_2$ through the intermediary of a first monostable 353 serving to generate from the pulses B complemented pulses B, an first NAND type gate 354 receiving on a first input the signal Q and on a second input the aforementioned signal $\overline{B}$, a second NAND type gate 355 receiving on a first input the pulses B and on a second input the signal $\overline{Q}$, and a third NAND type gate 356 receiving on respective first and second inputs the output signals delivered by the first and second NAND type gates 354 and 355 and delivering the periodic signal $S_{\tau 2}$ the cyclic ratio of which is representative of the duration $\tau_2$.

FIG. 3b shows in succession the pulses A, B, Q and $S_{\tau 2}$.

Thus the periodic signal $S_{\tau 2}$ whose cyclic ratio is representative of the duration $\tau_2$, and advantageously of the directly measured duration $\tau_2$, is of the form $S_{\tau 2} = \overline{B}Q + B\overline{Q}$. The signal $S_{\tau 2}$ is thus delivered to the four means for correcting the frequency of the voltage delivered by the inverter according to the value of the time interval $\tau_2$ relative to a reference value, which means will be described later in this description.

As shown in FIG. 3c, the means 34 for sensing passage through zero of the sensing signal may be based on an operational amplifier 340 whose negative input receives the signal sensed by the third sensor means 33 and whose positive input is connected to the reference voltage through the intermediary of a bias resistor R7, feedback being provided by a resistor R8 between the output of the operational amplifier 340 and the positive inut of this amplifier. A monostable 341 also serves to shape signals delivered by the operational amplifier 340 to provide the signals B as shown in FIG. 3b.

From the combination of schematics constituting FIG. 3c, there will be noted the presence of resistive components denoted $R_0, R_1, \ldots R_{17}$ which constitute bias or circuit components the values of which are normally specified by the manufacturer of the corresponding components consistin of the operational amplifiers 320, 340, the monostables 321, 341, the RS flip-flop 350 and the JK flip-flop 351, for example, Thus there is no need for a detailed description of the values enabling the combination of these components to be wired up.

For correct functioning of the embodiment of the sensor 3 shown in FIG. 3c it is advantageous to use compact circuits in order to minimize the influence of electromagnetic noise. In particular, the connection between the first, second and third sensor means 30, 31, 33 and the input of the operational amplifiers 320 and 340 is advantageously made by means of coaxial cables denoted 300, 310, 330, the amplifiers 320 and 340 chosen being amplifiers available through normal commercial channels but featuring a short rise time and a high sensitivity.

To achieve correct functioning of the system as shown in FIG. 3c, it is advantageous for the Q output of the JK flip-flop 351 to change state on each half-period even if no conduction in the diodes is sensed, the signal A remaining at the zero low logic level. To this end the Q output is forced to the value 1, the high logic level, when B goes high and to the value 0 (low logic level) when the signal B goes low. This arrangement makes it possible to reset to zero, as it were, the JK flip-flop 351.

Thus, the frequency of the supply voltage being slaved to a frequency near and higher than the resonant frequency of the load, the frequency regulation consists essentially in regulating a time such as the conduction time of the diodes or the time-delay between the load current $I_{RLC}$ passing through zero relative to the beginning of conduction in the diodes, times which are in all cases less thn one microsecond.

This time having been measured in the way previously described with sufficient accuracy and immunity to noise to enable effective regulation, there is still the requirement for the frequency of the inverter to be higher than the resonant frequency of the load, especially on starting up. When the inductor is started up the resonant frequency of the load is not known.

Rather than measuring the resonant frequency $f_0$ of the load, a measurement which it is not practicable to make under usual operating conditions, the regulator system in accordance with the invention is noteworthy in that it comprises a control loop for starting up self-oscillation at a frequency f higher than the resonant frequency $f_0$ of the load.

The load being an RLC type resonant circuit, as already described, the inverter may be regarded as a non-linear component which applied alternately to the load supply voltages of amplitude $+E/s$ and $-E/2$.

FIG. 4a shows how the current $I_{RLC}$ varies in response to successive transitions between $+E/2$ and $-E/2$ of the supply voltage delivered by the inverter to a load circuit with a resonant frequency $f_0$, the time T1 in FIG. 4a representing the conduction time of the switch concerned. The corresponding circuit is unstable and oscillates at a frequency higher than $\Omega_0/2\pi$, this frequency depending on the conduction time T1.

FIG. 4b shows the same waveform of the current $I_{RLC}$ relative to the inverter control voltage $U_C$. Note that the conduction tiem T1 includes the time-delay T'1 between the current $I_{RLC}$ passing through zero and the switching command $U_C$ and the time-delay T''1 between the switching command $U_C$ and the actual switching of the transistors t1 and t2, command time-delay plus transistor storage time. The time T''1 depends on the characteristics of the circuit and the characteristics of the transistor used.

To measure the time-delay T'1 between the current $I_{RLC}$ passing through zero and the switching command $U_C$, the control loop for starting up self-oscillation comprises, as shown in FIG. 4c, means denoted 50 for sensing the load current $I_{RLC}$ and a resistor-capacitor circuit denoted R'C' serving to generate, according to the load current $I_{RLC}$, a voltage UR' proportional to the load current $I_{RLC}$ and a voltage $U_C$, phase-shifted by $\pi/2$ relative to the voltage UR' and relative to the load current $I_{RLC}$. The common point of the resistor R' and the capacitor C' is connected to the reference potential. A comparator 51 whose positive terminal is connected to the side of the resistor R' connected to the sensing means and whose negative terminal is connected to the capacitor C' connected to the sensing means 50 is also provided, and a control circuit 52 receives signals deivered by the comparator 51 and delivers a regulation control signal.

As shown in FIG. 4c, the control loop further comprises a controlled oscillator 53 receiving from the control circuit 52 a signal which inhibits firing. The oscillator 53 is adapted to generate a substantially squarewave sinal of frequency f very much higher than the resonant frequency $f_0$ of the load in the absence of the firing inhibiting control signal and a signal of exactly the same frequency as the inhibiting control signal when the latter is present.

Given the way in which the circuit R', C' for sensing the current $I_{RLC}$ is implemented, as previously described, the time-delay T'1 satisfied the equation:

$$T1 = \frac{T}{2\pi} \arctan\left(\frac{T}{2\pi R'C'}\right)$$

in which T represents the period of the control signal $U_C$. The signal delivered by the oscillator 53 at the frequency f, in the order of 80 kHz, for example, may then be amplified if necessary by means of an amplifier 54 and used to control the inverter during the start-up phase, as shown in FIG. 4c.

FIG. 4d shows one advantageous embodiment of the comparator 51 shown in FIG. 4c, whereby the connection between the sensor means 50 and the comparator 51 is advantageously made by means of a triaxial cable 501 immunizing the signal delivered by the sensor means 50 from any electromagnetic interference. The comparator 51 may comprise an operational amplifier 510 whose negative input receives, for example, the voltage UR' delivered across the resistor R' through the intermediary of a resistor R17 and whose positive input receives the voltage UC' delivered by the capacitor C' through the intermediary of a resistor R170. The capacitors denoted C16 and C17 are wiring capacitors for the operational amplifier 510 values for which are specified by the manufacturer directly. A limiter circuit 511 consisting of a Zener diode D4 and a diode D5 drives an output stage 512 comprising a monostable through the intermediary of a resistor R18. The monostable 512 delivers the comparator output signal, the signal denoted $U_{before\ T2}$. The signal denoted $U_{before\ T2}$ delivered by the comparator 51 is received by the control circuit 52 the essential function of which is to apply a predetermined time-delay to the signal $U_{before\ T2}$ in order to generate a signal $U_{after\ T2\ control}$ serving to control the oscillator 53.

An advantageous embodiment of the oscillator 53 controlled by the signal $U_{after\ T2\ control}$ generated by the control circuit 52, which will be described later in this description, will now be described with reference to FIG. 4e. In the aforementioned figure, the controlled oscillator 53 may advantageously comprise an operational amplifier 530 whose positive input is connected in a feedback loop to the negative input through the intermediary of resistors denoted R20, R22, R21 and R19. The negative input of the operational amplifier 530 is connected to the reference voltage through the intermediary of a capacitor denoted C18. The control input of the oscillator 53 receives a firing inhibiting signal in the form of the signal $U_{after\ T2\ control}$ delivered by the control circuit 52 and applied to the positive terminal of the operational amplifier through the intermediary of a coupling capacitor C19 and the resistor R20.

Thus in the absence of the signal $U_{after\ T2\ control}$ constituting the firing or oscillation inhibiting signal, the oscillator 53 oscillates spontaneously at the frequency f which can have a relatively high value and in any event higher than 80 kHz. When the firing inhibiting signal, the signal $U_{after\ T2\ control}$ delivered by the control circuit 52, is present, the oscillator 53 is locked onto the frequency of the firing inhibiting signal $U_{after\ T2\ control}$ and delivers the latter to the amplifier stage 54. Note also that the oscillator 53 advantageously comprises at the level of the operational amplifier 530 an offset adjustment circuit comprising the resistors R25, R26 and a potentiometer denoted P3/4. Likewise, the amplifier stage 54 may advantageously comprise two complementary transistors 540, 541 serving as splitter amplifiers and connected to the output of the operational amplifier 530 by a resistor 23, the emitter of the transistor 540, 541 being loaded by a resistor R24. A switch K1 serves to connect the output of the amplifier 54 to the inverter control input.

A detailed description of the means 4 for correcting the frequency of the control voltage $U_C$ will now be given with reference to FIGS. 5a through 5d.

In the aforementioned figures, the means 4 for correcting the frequency of the voltage $U_C$ further comprise means 40 for delaying the regulation control signal by a time proportional to the integral of the value of the duration $\tau_2$ on each half-period of the control signal relative to a set point value $\tau_{2C}$. The corresponding signals representative of durations $\tau_2$ and $\tau_{2C}$ are denoted $S_{\tau 2}$ and $S_{\tau 2C}$.

The aforementioned timely-delay means 40 comprise, as shown in FIG. 5a, a high-speed clock denoted CLK delivering reference timebase pulses at a very high frequency. The high-speed clock CLK preferably delivers timebase pulses at a frequency of 40 MHz.

The time-delay means 40 further comprise digital means 400 for counting the number of reference timebase pulses between the times corresponding to the value of the duration $\tau_2$ of the signal $S_{\tau 2}$ of the half-period in question of the control signal and the value of the reference set point duration $\tau_{2C}$ of the signal $S_{\tau 2C}$. The digital means serve, by counting, to generate a digital signal representative of the error $\epsilon_{\tau 2}$ between the duration $S_{\tau 2}$ and the set point value $S_{\tau 2C}$. The digital counting means 400 may advantageously comprise an 8-bit counter, for example. This receives on a RESET input a signal generated from a synchronization signal denoted Sy complemented by means of a low-speed monostable 404. The clock pulses delivered by the clock CLK are counted through the intermediary of an AND type logic gate 405 receiving on one of its inputs the pulses delivered by the clock CLK and on the other input the signal $S_{\tau 2}$ representative of the duration $\tau_2$. The resultant signal delivered by the gate 405 is delivered direct to the counter or digital counting means 400, which further comprise an initialization and offset adjustment input, the initialization input serving, of course, to input the set point value $\tau_{2C}$. The digital counting means 400 deliver directly a digital signal $\epsilon_{\tau 2}$ representative of the error between the duration $S_{\tau 2}$ and the set point value $S_{\tau 2C}$.

The means 40 for delaying the regulation control signal further comprise digital integrator means denoted 401, as shown in FIG. 5b, serving to generate from the digital signal representative of the error $\epsilon_{\tau 2}$ between the duration $S_{\tau 2}$ and the set point value $S_{\tau 2c}$ a digital signal representative of the integral denoted $\Sigma \epsilon_{\tau 2}$. The signal representative of the aforementioned integral $\Sigma \epsilon_{\tau 2}$ is derived by the digital integrator means 401 from the digital signal $\epsilon_{\tau 2}$ delivered by the digital counting means 400. An appropriate bus connection is of course provided between the digital counting means 400 and the digital integrator means 401.

On the basis of the complemented digital signal representative of the integral $\Sigma \epsilon_{\tau 2}$, specifically on the basis of the complemented value of the most significant counting bit denoted $Q_{MSb}$, downcounter means 402 generate on a negative transition of the aforementioned signal a time-delay control signal. The time-delay control signal is denoted SCR in FIG. 5c.

A time-delay circuit 403 consisting of a type D flip-flop receives on its time-delay input the time-delay control signal designated $U_{before\ T2}$ or regulation control signa and on its control input the time-delay control signal denoted SCR previously mentioned. The time-delay circuit 403 thus delivers a delayed control signal denoted $U_{after\ T2}$, with the result that the regulation control signal is delayed by the value T2. Note in particular from FIG. 5c that the downcounter means 402 serve to generate a most significant counting bit $Q_{MSb}$, on the basis of the complemented digital signal representative of the integral $\Sigma \epsilon_{\tau 2}$, through the intermediary of an inverter 405, a synchroniation signal denoted Sy fed to a load input of the downcounter means 402 and a signal at the frequency of the clock CLK delivered in coincidence with the synchronization signal Sy through the intermediary of a gate 406. An inverter 407 produced the control signal SCR from the previously mentioned most significant counting bit.

Note also that the digital counting means 400 and the downcounter means 402 receive a signal denoted CLR serving to inhibit the means 40 for delaying the control and regulation signal and thus to inhibit the regulation function itself. The circuits for processing this signal CLR will not be described here, but it may be stated by way of non-limiting example only that the sinal CLR can have two complemented logic levels corresponding to presence of regulation and absence of regulation conditioned, for example, by the current $I_{RLC}$ sensed relative t an arbitrarily chosen reference value. For example, after rectification of the current $I_{RLC}$, the rectified voltage representative of the rectified current $I_{RLC}$ could be compared with a reference value, the result of the comparison serving to generate the two logic levels previously mentioned.

In an advantageous embodiment of the integrator system 401 shown in FIG. 5b the aforementioned digital integrator means may comprise a 2-input digital adder 4010, a first input receiving the digital signal $\epsilon_{\tau 2}$ representing the error between the duration $S_{\tau 2}$ and the set point duration $S_{\tau 2C}$. The adder 4010 delivers a digital signal representative of the integral $\Sigma \epsilon_{\tau 2}$. The digital integrator means 401 further comprise a buffer memory circuit 4011 receiving in write mode the signal representative of the integral $\Sigma \epsilon_{\tau 2}$ and delivering in read mode the same signal, the read output being further connected in a feedback loop to the second input of the adder circuit 4010. The digital adder 4010 may preferably comprise a 12-bit adder and the buffer memory circuit 4011 may preferably comprise rising edge triggered type D flip-flops on 12 bits.

FIG. 5d shows various embodiments of the synchronization signal Sy shown in FIGS. 5a, 5b, 5c and a specific embodiment of the control circuit 52 serving to generate the signal $U_{after\ T2}$ for inhibiting the oscillator 53.

With regard to obtaining the synchronisation signals Sy, as shown in FIG. 5d these may be obtained from an exclusive-OR type circuit 407 reciving on two inputs the signal denoted $U_{before\ T2}$ and the signal denoted $U_{after\ T2\ control}$. This latter signal $U_{after\ T2\ control}$ can be obtained from the circuit 52 as shown in FIG. 5d which, by means of a monostable 520 receiving the previously described signal CLR from a NAND gate 521 receiving the signal $U_{before\ T2}$ delivered by the comparator 53 and the signal delivered by the monostable 520, and from another NAND gate 522 receiving the signal CLR and the signal $U_{after\ T2}$ delivered by the output of the means 40 for delaying the regulation control signal and in particular by the time-delay circuit 403 of FIG. 5c, serves to obtain, from a third NAND gate 523 receiving the signals delivered by the NAND gates 521 and 522, the signal $U_{after\ T2\ control}$ constituting the command for inhibiting the oscillator 53, so as to lock the latter onto the frequency of the signal $U_{after\ T2\ control}$ after the firing period.

There will now be given with reference to FIG. 5e a detailed description of the functioning of the means 40 for delaying the regulation control signal by a time interval proportional to the integral of the value of the duration $\tau_2$ of the signal $S_{\tau 2}$ on each half-period of the control signal relative to a set point value $S_{\tau 2C}$.

FIG. 5e shows a timing diagram of the various essential signals including in particular the load current $I_{RLC}$, the signal $S_{\tau 2}$ whose pulse over a half-period of T/2 has a duration $\tau_2$ and the supply voltage delivered by the inverter of amplitude +E/2 or −E/2 applied to the switch and to the load. FIG. 5e shows the conduction time of the corresponding switch from the time at which the load current $I_{RLC}$ passes through zero, during the positive pulse +E/2 of the supply voltage for a given phase-shift value $\tau_2$ for the same current $I_{RLC}$ relative to the supply voltage pulse +E/2. This conduction time comprises two parts T1 and T2, the time T1 corresponding to the time T'1 and T"1 previously explained and the time T2 being added by the regulation function and in particular by the means 40 for delaying the regulation control signal by a time interval proportional to the integral of the value of the duration $\tau_2$ of the aforementioned signal $S_{\tau 2}$.

A mathematical study of the resonant load circuit R,L,C assuming to a first approximation that the circuit functions sinusoidally shows that the parameters T1, T2 and $\tau_2$ shown in FIG. 5e respectively satisfy the following equations:

$$\tau_2 = \frac{T}{2\pi} \arctan \frac{L}{R} \left( \frac{2\pi}{T} - \frac{1}{RC} \frac{T}{2\pi} \right)$$

$$T1 = K + \frac{T}{2\pi} \arctan \frac{T}{2\pi R'C'}$$

$$T2 = T/2 - T1 - \tau_2$$

in which K designates a constant.

For a command time-delay T'1 and a given storage time for a particular component used, an experimental study has shown that the time-delay parameter $\tau_2$ for conduction by the switches and thus for the value of the current $I_{RLC}$ relative to the supply voltage +E/2 or −E/2 delivered by the inverter satisfies a substantially linear law for the conduction time T2, this additional conduction time being introduced as a time-delay by the means 40 for delaying the control signal so as to obtain the time-delay value $\tau_2$ in question.

Thus the effect of the means 40 for delaying the regulation control signal is to delay the logic signal $U_{before\ T2}$ delivered by the comparator 51 by a time T2 substantially proportional to the integral of $\tau_2$ relative to the set point value $\tau_{2C}$ on each half-period of the supply voltage +E/2 or −E/2 through the intermediary of the control signal $U_C$.

FIG. 5e also shows the logic signal $U_{before\ T2}$ and the logic signal $U_{after\ T2}$, the latter being obtained by means of a shift or time-delay of value T2 applied by means of the time-delay circuit 403 of FIG. 5c. In operation, the digital means 400 for counting the numbr of reference timebase pulses first count these pulses for the time $\tau_2$ and the digital counting means 400 serve to obtain a digital value $\epsilon_{\tau 2}$ for the error between the value of $\tau_2$ measured and the set point value $\tau_{2c}$. To give a non-limiting example, the digital counting means 400 may be initialized to the start value $-\tau_{2C}$. The counting phase is identified by the reference numeral 1 within a circle in FIG. 5e. Following on from this counting phase, the downcounting means 402 are loaded with the preceding value of the integral $\Sigma\epsilon_{\tau 2}$, this integral having been stored in the register or buffer memory 4011. This loading phase of the downcounting means 402 is denoted by the reference numeral 2 in a circle in FIG. 5e.

The value of $\Sigma\epsilon_{\tau 2}$ is then counted down from the counting means 402 initialized to the value of the integral $\Sigma\epsilon_{\tau 2}$ complemented by the inverter 405, passage of the most significant bit $Q_{MSb}$ through zero being sensed. This phase is represented by the encircled reference numeral 3 in FIG. 5e. Adding the last value of $\epsilon_{\tau 2}$ in the digital counting means 400 to the preceding value of $\Sigma\epsilon_{\tau 2}$ is then effected by the digital adder 4010, this operation being indicated by the encircled reference numeral 4 in FIG. 5e. The counting means 400 are then reset to the set point value, this operation being indicated by the encircled reference number 5 in FIG. 5e.

To provide for accurate measurement of $\tau_2$, which is approximately 500 nanoseconds, at least 10 analysis cycles are required, that is a frequency of 20 MHz. To provide a simple way of adjusting the gain, the frequency of the timebase pulses is advantageously equal to 40 MHz, as previously mentioned. A clock frequency of this magnitude entails the use of a TTLS type technology, for example. Countin down of the time-delay T2 from the value of the integral $\Sigma\epsilon_{\tau 2}$ is thus effected by the downcounting means 402, which can advantageously consist of a 12-bit counter able to count at 40 MHz.

The functioning of the previously described generator regulation system may be summarized as follows: the supply voltage for the bridge delivered by the inverter andof amplitude E is first reset to zero. The switch K1 of the amplifier output stage 54 of the self-oscillation start-up cntrol loop then goes to the closed position and the amplitude of the supply voltage is then increased. The generator immediately goes into self-oscillation, the conduction time of the diodes not yet being regulated. This start-up sequence, already described, is necessary in the case where dual thyristors are used, as these cannot be started up at a non-zero voltage.

When the peak current $I_{RLC}$ at the generator output reaches a sufficiently high value it is compared with a threshold value, as already described, in order to generate the signal CLR which controls presence or absence of the regulation function, this being activated by the signal CLR previously mentioned.

Experience shows that the system in accordance with the invention has the intended advantages, starting up in two stages enabling starting up under any load conditions, even where the load impedance is very high. This is made possible by the fact that the system for starting up self-oscillation is highly sensitive and functions with very low currents, meaning currents very much less than one ampere. Also, staring up at a zero or near-zero voltage results in relatively little stress on the switches and means that there are virtually no start-up transients in the matching transformers.

It will also be noted that no disadvantage arises from the existence of some slight lack of symmetry between the conduction times of the diodes on the bridge diagonals, resulting from differences between the characteristics of the diodes employed. The regulation function relies on the average conduction time so that in practise any such lack of symmetry has virtually no effect.

In accordance with another advantageous characteristic of the regulator system in accordance with the invention, and as shown in FIG. 6, the system further comprises a loop for regulating the power according to the inverter supply voltage level. FIG. 6 shows the so-called high-speed frequency regulation loop, as described previously, together with a so-called low-speed loop operative at the level of the rectifiers feeding the inverter. Loop 4 regualting the power according to the inverter supply voltage level will not be described since it entails the use of known theory and practise of rectified voltage level control. Nevertheless, this power regulation loop makes it possible to use a regulator system in accordance with the present invention with a very high degree of flexibility in use, transmission of power or energy to the load being effected by slaving the frequency of the magnetic field induced to a value very near but in all events higher than the resonant frequency of the load, and by regualting the power by acting on the inverter supply voltage and thus on the controlled rectifier bridge or on the chopper. Also, for one and the same inductor different capacitors can be used to obtain different operating frequencies. Finally, provision may also be made for controlling a number of safety devices and starting and stopping sequences.

There is claimed:

1. Regulator system for a switching mode inverter generator adapted to feed an inductively coupled load and seeing said load as a series resonant circuit having a resonant frequency which varies with its magnetic state, said system comprising:
   at least two switches adapted to connect said load to the output of said inverter, said inverter delivering a voltage at its output, each of said at least two switches comprising a switching element and switching terminals;
   a respective diode shunting said switching terminals of said switching element of each of said at least two switches; and
   a frequency control loop adapted to slave the output frequency of said inverter voltage to said resonant frequency of said load, wherein said frequency control loop controls the conduction time of a diode and/or the time interval between conduction starting in said diode and the load current passing through zero; and
   wherein said frequency control loop comprises:
   sensor means for measuring the time interval between the start of conduction in said diode and the load current passing through zero; and
   means for correcting the frequency of said voltage delivered by said inverter as a function of the time interval between the start of conduction in said diode and said load current passing through zero in comparison with a reference value.

2. System according to claim 1, wherein said sensor means comprises:
   first means for sensing the current flowing in one of said at least two diodes;
   second means for sensing the current flowing in the other one of said at least two diodes;
   means for shaping signals delivered by said first and second sensor means in order to generate a periodic signal at twice the frequency of said current flowing through said diodes.
   third means for sensing said current flowing through said load and delivering a sensing signal representative of said current,
   means for sensing passage through zero of said sensing signal and delivering a pulse when said sensing signal passes through zero, and
   a logic circuit receiving said periodic signal at twice the frequency of said currents flowing through said diodes and said pulses delivered by said passage through zero sensing means and delivering a squarewave periodic signal whose cyclic ratio is representative of the time interval between the start of conduction in said diode and said load current passing through zero.

3. System according to claim 2, wherein said means for shaping said signals delivered by said first and second sensing means comprise:
   an operational amplifier having a negative input connected to receive said signals delivered by said first and second sensing means and a positive input connected in a feedback loop to the output of said amplifier; and
   a monostable multierlrator adapted to shape summed signals delivered by said operational amplifier.

4. System according to claim 2, wherein said logic circuit comprises:
   a first flip-flop receiving, on two inputs, said pulses delivered by said means for sensing passage through zero of said sensing signal;
   a second flip-flop receiving, on the one hand, said signal delivered by said logic circuit delivering said squarewave periodic signal whose cyclic ratio is representative of said time interval between said start of conduction in said diode and said passage through zero of said load current through an inverter circuit so as to deliver to said second flip-flop a complemented signal, and said second flip-flop receiving, on the other hand, complemented outputs delivered by said first flip-flop, said second flip-flop outputting a direct signal and a complemented signal,
   a first monostable multierlrator serving to complement said pulses delivered by said means for sensing passage through zero of said sensing signal;
   a first NAND gate receiving on a first input said direct output from said second flip-flop and on a second input said complemented output from said monostable multierlrator.
   a second NAND gate receiving on a first input said pulses delivered by said means for sensing passage through zero of said sensing signal and on a second input said complemented output of said second flip-flop; and
   a third NAND gate receiving on respective first and second inputs, output signals delivered by said first and second NAND gates and delivering said periodic signal whose cyclic ratio is representative of said time between said start of conduction in said diode and said passage through zero of said load current.

5. System according to claim 1, wherein said periodic signal whose cyclic ratio is representative of said time between said start of conduction in said diode and said passage through zero of said load current, is of said form $S_{T2} = B\bar{Q} + \bar{B}Q$, where $S_{T2}$ is said periodic signal, B and $\bar{B}$ are respectively said pulses delivered by said means for sensing passage through zero of said sensing signal and the complemented form thereof and Q and $\bar{Q}$ are respectively the direct and the complemented outputs of said second flip-flop.

6. System according to claim 1, further comprising a second control loop for starting up self-oscillation at a frequency higher than said resonant frequency of said load.

7. System according to claim 6, wherein said second control loop for starting up self-oscillation at said frequency higher than said resonant frequency of said load comprises:
   means for sensing said load current;
   a resistor-capacitor circuit deriving from said load current a voltage proportional to said load current and a voltage phase-shifted by $\pi/2$ relative to said voltage proportional to said load current and relative to said load current, a terminal common to the resistive and capacitive components of said resistor-capacitor circuit being connected to a reference potential;
   a comparator comprising an operational amplifier whose positive terminal is connected in common with the other terminal of said resistive component of said resistor-capacitor circuit and said sensing means, and whose negative terminal is connected in common with the other terminal of said capacitive component of said resistor-capacitor circuit and said sensing means; and
   a control circuit receiving said signals delivered by said comparator and delivering a regulation control signal.

8. System according to claim 7, wherein said second control loop further comprises a controlled oscillator receiving from said control circuit a firing inhibiting signal, said oscillator being adapted to generate a substantially squarewave signal at a frequency higher than said resonant frequency of said load in the absence of said firing inhibiting signal and a signal at precisely the same frequency as said firing inhibiting signal in the presence thereof.

9. System according to claim 8, wherein said controlled oscillator comprises an operation amplifier having a positive and a negative input, said positive input being connected in a feedback loop to said negative input which is further connected to said reference potential by a capacitor, a control input receiving said firing inhibiting signal being connected to said positive terminal of said operational amplifier by a coupling capacitor.

10. System according to claim 9, wherein said means for correcting said frequency of said control voltage further comprise means for delaying said regulation control signal by an amount proportional to the integral of said periodic signal duration on each half period of said control signal relative to a set point value for said periodic signal duration.

11. System according to claim 10, wherein said time-delay means comprise:
   a high-speed clock delivering reference timebase pulses;
   digital means for counting the number of said reference timebase pulses between times corresponding to the value of said period signal duration for the half-period in question of said control signal and the value of a said reference set point, said digital means, by counting, generate a digital signal representative of the error between said periodic signal duration and said set point value;
   digital integrator means for generating a digital signal representative of the integral of said error between said periodic signal duration and said set point value;
   downcounting means for generating a time-delay control signal from said digital signal representative of said integral after it has been complemented, specifically from the complemented value of the most significant counting bit on a negative transition of said digital signal; and
   a time-delay circuit receiving on a delay input said regulation control signal and on a control input said time-delay control signal and delivering said delayed contrl signal.

12. System according to claim 11, wherein said digital integrator means comprise:
   a two-input digital adder, a first input receiving the digital signal representative of the error between said periodic signal duration and said set point value, said adder delivering a digital signal representative of said integral of said error; and
   a buffer memory circuit receiving in write mode said digital signal representative of said integral of said error and delivering the same signal in read mode, its read output being also connected in a feedback loop to said second input of said adder circuit.

13. System according to claim 12, further comprising a power regulator loop conditioned by the inverter supply voltage.

* * * * *

UNITED STATES PATENT AND TRADEMARK OFFICE
CERTIFICATE OF CORRECTION

PATENT NO. : 4,868,728
DATED : 9/19/89
INVENTOR(S) : Nuns

It is certified that error in the above-identified patent and that said Letters Patent is hereby corrected as shown below:

| | | |
|---|---|---|
| col. 01, line 12 | delete "heatint" | insert --heating-- |
| col. 01, line 21 | delete "ismade" | insert --is made-- |
| col. 03, line 24 | delete "a and b" | insert --$\underline{a}$ and $\underline{b}$-- |
| col. 03, line 54 | delete "poins" | insert --points-- |
| col. 03, line 54 | delete "a and b" | insert --$\underline{a}$ and $\underline{b}$-- |
| col. 04, line 42 | delete "/$_1$" | insert --$\tau_1$-- |
| col. 04, line 68 | delete "$\tau$hd 2" | insert --$\tau_2$-- |
| col. 05, line 37 | delete "I'hd RLC" | insert --$I_{RLC}$-- |
| col. 06, line 44 | delete "consistin" | insert --consisting-- |
| col. 07, line 21 | delete "f" | insert --$\underline{f}$-- |
| col. 07, line 37 | delete "tiem" | insert --time-- |
| col. 07, line 67 | delete "f" | insert --$\underline{f}$-- |

UNITED STATES PATENT AND TRADEMARK OFFICE
CERTIFICATE OF CORRECTION

PATENT NO. : 4,868,728
DATED : 9/19/89
INVENTOR(S) : Nuns

It is certified that error in the above-identified patent and that said Letters Patent is hereby corrected as shown below:

| | | |
|---|---|---|
| col. 08, line 14 | delete "f" | insert --$\underline{f}$-- |
| col. 08, line 62 | delete "f" | insert --$\underline{f}$-- |
| col. 10, line 09 | delete "signa" | insert --signal-- |
| col. 10, line 31 | delete "sinal" | insert --signal-- |
| col. 10, line 35 | delete "t" | insert --to-- |
| col. 12, line 40 | delete "Countin" | insert --Counting-- |
| col. 12, line 48 | delete "andof" | insert --and of-- |
| col. 14, line 33 | delete "multierlrator" | insert --multivibrator-- |
| col. 14, line 52 | delete "multierlrator" | insert --multivibrator-- |
| col. 14, line 58 | delete "multierlrator" | insert --multivibrator-- |
| col. 16, line 37 | delete "contrl" | insert --control-- |

Signed and Sealed this

Twenty-eighth Day of May, 1991

*Attest:*

HARRY F. MANBECK, JR.

*Attesting Officer*          *Commissioner of Patents and Trademarks*